United States Patent Office 3,071,874
Patented Jan. 8, 1963

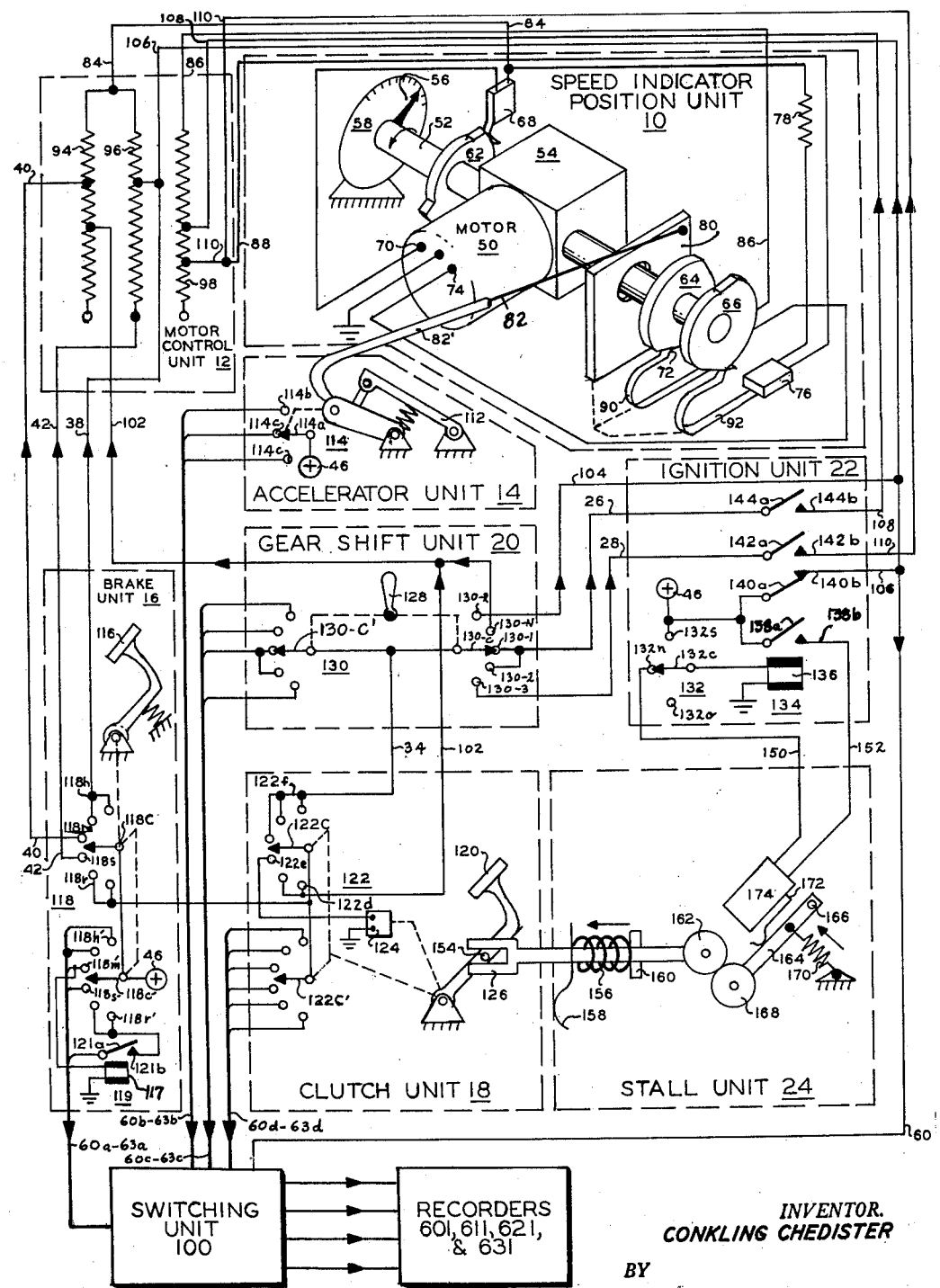

3,071,874
DRIVER TRAINING APPARATUS
Conkling Chedister, 330 E. Cedar St., Livingston, N.J.
Filed Sept. 17, 1957, Ser. No. 684,538
16 Claims. (Cl. 35—11)

This invention relates to driver training apparatus and more particularly to apparatus for training a subject in the operation of controls associated with controlling vehicular motion.

Driver training apparatus generally includes a stationary vehicle simulator with controls such as the accelerator, brake, clutch and gear shift of an automobile. In order that the subject may relate the operations of these controls to vehicular motion, a speed indicator is usually incorporated in the training apparatus. The speed indicator, simulating a speedometer, is responsive to the controls.

Interposed between the controls and the speed indicator is a system which transforms the mechanical movement of the controls to a displacement of the speed indicator. Thus, for example, when the subject depresses the accelerator, the speed indicator gives an indication of increased speed, and when the brake is operated, an indication of a reduction in speed results.

One of the methods for simulating a speed indicator is to use the controls for regulating the electrical power fed to a motor. A conventional tachometer is coupled to the motor by means of a shaft. The tachometer is calibrated to convert the revolutions-per-minute of the shaft to a simulated miles-per-hour indication.

However, it has been found that conventional tachometers are not accurate enough for training purposes. In particular, there is considerable difficulty in duplicating the results when tachometers are changed. Besides, frequent and complex adjustments are required, so that maintenance is expensive.

In addition to the tachometer problem, the motor presents difficulties. Since the speed of the motor is dependent on the amplitude of the voltage it receives, any variations in line voltage or even transients in the apparatus affect the speed of the motor. Thus reproducibility of results is difficult unless complicated and expensive voltage regulating systems are employed.

In spite of these limitations, fairly successful driver trainers have been built. These driver trainers, however, are quite complex and require frequent and highly-skilled maintenance. Further, the wide use of driver trainers has created a demand for even greater realism in the simulation of the operation of controls such as the clutch pedal, and a demand for better testing of the operation of the brake pedal under certain driving conditions.

Therefore, a general object of the invention is to provide improved driver training apparatus.

It is another general object of the invention to provide less complex driver training apparatus which requires a minimum of maintenance and yet which yields a truer simulation of actual driving conditions.

A further object of the invention is to provide driver training apparatus which, by eliminating the tachometer and minimizing dependency on the motor voltage supply system, permits speed indication readings to be highly accurate and easily reproducible.

Still another object of the invention is to provide improved apparatus for realistically simulating the operation of the clutch pedal.

A still further object of the invention is to provide improved apparatus for recording proper operation of the brake pedal under certain driving conditions.

Other objects of the invention will be obvious or may be learned by practice with the invention, the same being realized and attained by means of the combinations, improvements and instrumentalities pointed out in the appended claims.

The invention consists of the novel parts, constructions, arrangements, combinations and improvements herein shown and described.

In accordance with one embodiment of the invention, apparatus is provided for training a subject to move a plurality of controls. The apparatus includes a switching means responsive to the movement of a first control such as an accelerator. The switching means activates a motor means. A movable member responds to the motor means to again actuate the switching means, this time for deactivating the motor means when the movable member is in a position corresponding to the position of the first control. A control means responsive to a second control (for example, a gear shift) determines the rate of operation of the motor means. Included is an indicator (for example, a speed indicator) responsive to the position of the movable member to indicate the amount of movement of the first control.

Another feature of the invention is apparatus for simulating a stall when the clutch pedal is too rapidly engaged. The apparatus includes a simple, inexpensive and highly reliable switch means responsive to the rate of clutch pedal engagement.

A further feature of the invention is apparatus for testing brake pedal operation under simulated downhill or slippery roadway conditions. For these conditions it is necessary to "pump" (periodically depress and release) the brake pedal. The test is accomplished by a first switching means responsive to brake pedal movement, and a delayed operating switching means responsive to the first switching means for transferring a signal to a recording means when the brake pedal is in a predetermined position.

A still further feature of the invention is apparatus to simulate the feel of clutch engagement. As the clutch pedal is released from full depression, a switch responsive to the position of the clutch pedal energizes a vibrating means to momentarily vibrate the clutch pedal.

The invention in its broader aspects is not limited to the specific combinations, improvements and instrumentalities described, but departures may be made therefrom within the scope of the accompanying claims without departing from the principles of the invention and without sacrificing its chief advantages.

Other objects, features and advantages of the invention will be evident from the following description together with the accompanying drawing in which the sole FIGURE shows driver training apparatus in accordance with a preferred and illustrative embodiment of the invention.

GENERAL DESCRIPTION

The sole FIGURE shows driven training apparatus to train and test a subject in the manipulation of controls normally associated with controlling the motion of a vehicle in accordance with a preferred and illustrative embodiment of the invention. A speed indicating means is provided to give a subject and indication of the effects of certain controls on the motion of the vehicle. Sensing and recording means are also provided to permit sensing and recording of the operation of controls by a subject. Thus whenever a subject operates a control, the speed indicating means gives the subject a visual indication of the effect on the speed of the vehicle, and the sensing and recording means give the instructor an indication of the manner in which the subject operated the controls.

The driver-training apparatus generally comprises a speed indicator position unit 10 for indicating vehicular speed, a motor control unit 12 for controlling the speed at which said speed indicator position unit 10 responds to the manipulation of controls, an accelerator unit 14, a brake unit 16, a clutch unit 18, a gearshift unit 20, an ignition unit 22, a stall unit 24, a switching unit 100 for selectively sensing the operation of predetermined controls, and the recorders 601, 611, 621 and 631 for recording the operation of the selected controls.

It should be noted that the apparatus may readily be incorporated in a complete driver testing and training system of the type disclosed in the copending U.S. application, Serial No. 683,814, filed September 13, 1957, now Patent No. 3,015,169 in which the present applicant is a co-inventor. Thus the construction of the switching unit 100 and recorders 601, etc., and the necessary interconnections are shown in detail in the copending application.

Under visual or oral command from an instructor the subject is directed through a simulated driving situation. In a typical procedure, the subject turns an ignition key in the ignition unit 22 to "start" the vehicle, energizing relay 134 to connect the gear shift unit 20 to the motor control unit 12 via the lines 26 and 28 and the lines 108 and 110.

Continuing the procedure, the subject may depress the clutch pedal 120 and shift into first gear. Upon releasing the clutch pedal 120, a path is established from the clutch unit 18 via the line 34, the gear shift unit 20, the line 26, the ignition unit 22 and the line 108 to the motor control unit 12.

The vibrator 124 vibrates the clutch pedal 120 to simulate engagement of the clutch.

As the subject depresses the accelerator pedal 112 in the accelerator unit 14 after shifting into first gear, linkage 82, 82' displaces the cam-operated switch 72 in the speed indicator position unit 10 around the forward cam 64 to close a circuit to the motor 50. The motor 50 is energized and rotates the shaft 52 to move the indicator 56 on a calibrated scale 58 from a zero position to a position related to the amount of depression of the accelerator pedal 112. As the motor 50 rotates, the forward cam 64 is driven, and upon activating the cam-operated switch 72, opens the motor circuit. The indicator 56 now indicates the related "speed." The reverse cam 66 and the cam-operated switch 76 are employed when the rotation of the motor 50 is reversed, and therefore the indicator 56 is reversed to simulate decreasing speed. It may be seen that the above motor control elements comprise position control means for controlling the position of the motor.

In a similar manner the subject can shift into second and third gears. When the operator is in third gear and further depresses the accelerator pedal 112, the rate at which the speed indicator changes position is different than for the first and second gears to simulate actual driving conditions, and the motor control unit 12 feeds a different voltage to the speed indicator position unit 10. In other words, the indicator 56 moves to a position corresponding to the position of a first control (accelerator pedal 112) at a rate determined by the position of a second control (gear shift 128).

If at any time during shifting, the clutch pedal 120 is improperly operated, i.e. engaged too rapidly, a stall unit 24 responsive to rate of clutch pedal engagement breaks a circuit in the ignition unit 22, opening the circuit between the gear shift unit 20 and the motor control unit 12. The speed position indicator unit 10 then shows a deceleration to zero, indicating a stall.

Whenever the operator depresses the brake pedal 116 in the brake unit 16 while the indicator shows a speed reading, a voltage is fed via one of the lines 38, 40 or 42 to the motor control unit 12. The motor control unit 12 feeds a related voltage to the reverse winding of the motor 50 in the speed indicator position unit 10 and the indicator 56 is driven toward the zero position. The rate of speed at which the indicator 56 is driven to the zero position is a function of how far the brake pedal 116 is depressed. The line 38, 40 or 42 is connected into the circuit, depending on the amount of brake pedal depression. Lines 38, 40 and 42 feed different voltage dropping means in the motor control unit 12 which feeds power to the motor 50.

A time delay relay 119 of the brake unit 16 is actuated if the brake pedal 116 is pumped by periodically depressing it partially and then releasing it, or if the brake pedal 116 is maintained in a partially depressed position for a predetermined period. This permits the testing of proper brake operation on slippery roads and on steep down-grades.

When the controls (gear shift, clutch, brake, accelerator) are manipulated by the subject, corresponding signals are fed from switch contacts of relay 134, gear shift switch 130, clutch switch 122c', brake switch 118c', brake relay 119 and accelerator switch 114 via the lines 60, 60a—63a, 60b—63b, 60c—63c, 60d—63d, to a switching unit 100 where a selection of the lines is performed by means of a master control unit (not shown). The signals from the selected lines are fed to the recorders 601, etc. to permanently record, for later study, the subject's response to particular driving situations.

While the basic speed control situations encountered in driving have been described, other speed control situations occur. These situations, such as decelerating without braking and moving the gear shift lever to neutral or reverse while the vehicle is moving forward, are hereinafter described.

DETAILED DESCRIPTION

Speed Indicator Position Unit 10

The speed indicator position unit 10 is a static type of position indicator which is displaced from rest position to rest position as the amount of accelerator 112 depression is changed, or when other controls such as the brake pedal 116 are operated which would normally change the speed of the vehicle.

The speed indicator position unit 10 comprises the motor 50 which is capable of rotating in a forward or reverse direction and which is speed-controllable by regulating the voltage developed across its terminals. The shaft 52 is coupled to the motor 50 via reduction gear box 54. Rigidly fixed to the shaft 52 is the indicator 56 operatively positioned with respect to a calibrated speed scale 58 (viewed from the rear), a limit cam 62, a forward cam 64, and a reverse cam 66.

Operatively disposed with respect to the limit cam 62 is a normally closed single-pole, single-throw switch 68. The switch 68 is permanently positioned on the circle described by the limit cam 62 to permit its being opened by the limit cam 62 when the shaft 52 moves the indicator 56 to the zero position. Since the switch 68 controls the voltage connection to the reverse direction terminal 70 of the motor 50, the motor 50 stops when the limit cam 62 actuates the switch 68.

A normally open single-pole, single-throw switch 72 is disposed for actuation by the forward cam 64. The switch 72, having one contact coupled to the forward direction terminal 74, controls the starting and stopping of the motor 50 in the forward direction.

Operatively associated with the reverse cam 66 is a normally open single-pole, single-throw switch 76. One contact of the switch 76 is coupled via the resistor 78 to a contact of the switch 68. As is hereinafter described, the switch 76 controls the reverse rotation of the motor 50 when the accelerator is raised from a depressed position. The switches 68, 72 and 76 are preferably of the micro-switch type.

The switches 72 and 76 are mounted by means of an angle bracket (not shown) to a rotatable mounting plate 80. The mounting plate 80 is loosely coupled to the shaft 52 and is free to rotate about the shaft's axis. The mechanical linkage 82, 82' connects the mounting plate 80 to the accelerator pedal 112 in the accelerator unit 14. Thus, as the accelerator pedal 112 is depressed, the mounting plate 80 rotates counterclockwise around shaft 52 thereby rotating switch assemblies 72 and 76 counterclockwise about their respective cams 64 and 66; when the accelerator pedal is released, the mounting plate rotates clockwise around shaft 52 thereby rotating switch assemblies 72 and 76 clockwise about their respective cams 64 and 66. On the other hand rotation of shaft 52 moves the cams 64 and 66 relative to the switch assemblies 72 and 76. It is thus seen that a cam and its associated switch may both move relative to each other. The high and low portions of the cams 64 and 66 are substantially out of phase with each other. However, the cams 64 and 66 have a small mutually inoperative sloping region about the point where overlap would occur.

During normal conditions power is fed from the motor control unit 12 via one of the lines 84, 86 and 88 to one of the associated switches 68, 72 or 76, and then to the motor 50 to rotate the shaft 52 for positioning the indicator 56. The several conditions that arise will now be discussed.

When the gear shift lever 128 is in one of the forward drive positions (first, second, or third), a controlled amount of power is fed from the motor control unit 12 via the line 86 to the switch 72. When the accelerator 112 is depressed, the linkage 82 causes a counterclockwise rotation of the mounting plate 80 and therefore of the switches 72 and 76. In particular, the switch actuation member 90 of the switch 72 is backed off the high portion of the forward cam 64, and the switch 72 closes. When switch 72 closes, power is fed to the forward direction terminal 74 and the motor 50 rotates the shaft 52 in a counterclockwise direction causing the indicator 56 to show a higher speed. The shaft 52 continues rotating until the high portion of the forward cam 64 again engages the switch actuation member 90 to open the switch 72, stopping the motor 50. The cam, in effect, follows the switch displacement until they are again in the deactivated state.

If now the accelerator pedal 112 is raised, the linkage 82 is extended longitudinally and causes a clockwise rotation of the mounting plate 80 and the switches 72 and 76. In particular, the switch actuation member 92 of the switch 76 is backed off the high portion of the reverse cam 66 to close the switch 76. When switch 76 is closed, a circuit is connected from the motor control unit 12, via the line 88, the switch 76, the resistor 78, the switch 68 (normally closed) to the reverse direction terminal 70 of the motor 50. The shaft 52 then rotates in a clockwise direction and the decrease in speed is indicated. The rotation of shaft 52 continues until the high portion of the reverse cam 66 again engages the switch actuation member 92 to open the circuit.

It should be noted that the circuit for deceleration includes the switch 68. Switch 68, which is normally closed, is opened when the zero position of the shaft 52 and indicator 58 is reached. The switch 68 is also used for controlling the motor 50 during other deceleration situations, such as braking, clutching, stalling and shifting into neutral or reverse.

In any of these situations, power is fed from the motor control unit 12 via the line 84 to the switch 68. The power is fed to the reverse control terminal 70 of the motor 50, causing the shaft 52 to rotate clockwise, and the decrease in speed is indicated. The clockwise rotation continues until either the decelerating power fed from the motor control unit 12 is turned off by the subject ending the manipulation of a control, i.e. removing his foot from the brake or clutch pedals, or by actuation of the switch 68 by the limit cam 62 when the zero position is reached. Thereafter the accelerator again controls the motor 50 driving it to a position which corresponds with the degree of accelerator pedal deflection.

The rate at which the indicator 56 returns toward zero is dependent on the amount of depression of the brake pedal 116, which controls the amount of power fed to the reverse direction terminal 70 of the motor 50. In other words the indicator 56 moves toward a position corresponding to the position of a first control (accelerator 112 at the nondepressed or zero position) at a rate determined by the position of a second control (brake pedal 116).

Thus, in accordance with this feature of the invention, relatively reliable apparatus is provided for realistically reproducing the operation of a speed indicator which is rugged and therefore requires a minimum of maintenance.

The Motor Control Unit 12

The motor control unit 12 is primarily a means for regulating the amount of power fed to the motor 50 of the speed indicator position unit 10 to control the rate of speed at which the shaft 52 is rotated to simulate various conditions of acceleration and deceleration.

All voltages received by the motor control unit 12 from the operator control units, such as the brake unit 16, have the same magnitude. These voltages are dropped a predetermined amount before being fed to the speed indicator position unit 10 via the lines 84, 86 and 88. The voltage dropping is accomplished by connecting the input voltage lines to the tapped resistors 94, 96 and 98. The input voltage lines are summarized in Table I.

TABLE I

| Line | Source | Remarks |
|---|---|---|
| 38 | Brake unit 16 | Hard braking. |
| 40 | ----do---- | Medium braking. |
| 42 | ----do---- | Soft braking. |
| 102 | Clutch unit 18 and gearshift unit 20. | Neutral position or clutch disengaged. |
| 104 | Gearshift unit 20 | Reverse. |
| 106 | Ignition unit 22 | Stall. |
| 108 | Gearshift unit 20 | First and second gear. |
| 110 | ----do---- | Third gear. |

It should be noted that the line 102 is coupled to both the neutral position contact of the gearshift unit 20 and the clutch disengaged contact of the clutch unit 18, since either operation would product an identical effect on the vehicle's motion.

It should be further noted that the lines 108 and 110 are connected from the gear shift unit 20 via the ignition unit 22, so that during a stall these lines are blocked.

The Accelerator Unit 14

The accelerator unit 14 comprises the accelerator pedal 112, the linkage 82 for mechanical coupling of the accelerator pedal 112 to the switches 72 and 76 in the speed indicator position unit 10, and the switch 114 whose fixed contacts are coupled via lines 60b—63b to the switching unit 100. The moving contact 114a of the switch 114 is electrically connected to a source of power 46 and mechanically coupled to the accelerator pedal 112. When the accelerator pedal 112 is undepressed or partially depressed, a corresponding signal is transmitted via the fixed contact 114b or the fixed contact 114c, via one of the lines 60b—63b, and the switching unit 100, to the recorders 601, etc., to record the operator's manipulation of the accelerator pedal 112.

The Brake Unit 16

The brake unit 16 comprises the brake pedal 116 mechanically coupled to signal driving means conveniently embodied as the moving contacts 118c and 118c' of a double-pole, multi-position switch 118. The moving contacts 118c and 118c' are electrically connected to the power source 46. When the brake pedal 116 is in the rest position, a voltage is transmitted via the contact 118r to the clutch unit 18 to permit clutch control functions only when the brake is released. At the same time, under conditions as noted hereinafter, a signal is transmitted via the corresponding contact 118r' and one of the lines 60a—63a to the switching unit 100. In the soft braking position, a voltage is fed via the fixed contact 118s and the line 42 to the motor control unit 12. In the medium braking position, the voltage is fed via the fixed contact 118m and the line 40, and in the hard braking position the voltage path is via the fixed contact 118h and the line 38. At the same time, signals are sent via the corresponding contacts 118s', 118m' and 118h', and via the switching unit 100, to the recorders 601, etc.

The pumping action of the brake pedal 116 is a normal subject manipulation when simulating the braking of the vehicle on a downgrade or upon a slippery roadway. To record this operation the coil 117 of a time-delay relay 119 is connected to the fixed contact 118m' of the switch 118, and the relay's normally open contacts 121a and 121b are interposed between the fixed contact 118r' and one of the lines 60a—63a. The time-delay relay 119 is a commercially available relay manufactured by the Amperite Corporation, having the property of being energized after a sustained current passes through its coil 117 for two to three seconds, or after successive pulses of current over a short period have been applied to the coil 117 (see Amperite Catalog TR81, model 115-NO-3). The time-delay relay 119 has the further property that, once energized, its contacts 121a and 121b will open several seconds after the current stops flowing through the coil 117.

During a situation requiring a pumping action, the subject periodically partially depresses and releases the brake pedal 116. During each depression a pulse of current is fed from the power source 46, via the moving contact 118c' and the fixed contact 118m', to the coil 117. One of the current pulses will cause the closing of the contacts 121a and 121b.

If the brake pedal 116 is released within several seconds after the closure, a signal is transmitted from the power source 46 via the moving contact 118c', the fixed contact 118r', the contacts 121a and 121b, one of the lines 60a—63a, to the switching unit 100 for energizing one of the recorders 601, etc. However, if the subject fully depresses the brake pedal 116 without periodic releases, the time-delay relay 119 is not energized and there is no record of a brake pumping operation.

Thus a circuit has been shown which, by utilizing a minimum of apparatus, permits the recording of the pumping action of a brake pedal by a subject. The apparatus includes a relatively inexpensive commercially available time-delay relay which is both long-lived and reliable.

Clutch Unit 18

The clutch unit 18 comprises the clutch pedal 120 mechanically coupled to the moving contacts 122c and 122c' of the double-pole, multi-position switch 122, the vibrator 124 of well-known type similar to a common electrical massager, and via the coupling member 126 to the stall unit 24. When the clutch pedal 120 is fully depressed, a voltage is fed via the fixed contact 122d and the line 102 to the motor control unit 12. As the clutch pedal 120 is raised to the point of engagement, a voltage is fed to the vibrator 124 to give the operator the "feel" of clutch engagement. Thus the apparatus provides for a very realistic simulation of clutch operation. On complete release of the clutch pedal 120, a voltage is fed via the fixed contacts 122f and the line 34 to the gearshift unit 20. At the same time, a corresponding movement is accomplished by the moving contact 122c' in the second bank to send signals to the recorders 601, etc., via the lines 60d—63d and the switching unit 100.

If the clutch pedal 120 is released too quickly the stall unit 24 is activated via the coupling member 126, hereinafter more fully described.

The Gear Shift Unit 20

The gear shift unit 20 comprises the gear shift lever 128 mechanically coupled to moving contacts 130c and 130c' of the double-pole, multi-position switch 130. The moving contacts 130c and 130c' receive a voltage via the line 34 when the clutch pedal 120 is fully released. This voltage is transmitted via the contact 130–r to the line 104 when the gearshift lever 128 is in the reverse position, via the contact 130–n to the line 102 for the neutral position, via the contact 130–1 to the line 26 in the first position, and so on. At the same time, signals are sent via corresponding fixed contacts in the second bank of the switch 130, the lines 60c—63c, the switching unit 100, to the recorders 601, etc.

The Ignition Unit 22

The ignition unit 22 comprises the ignition switch 132 and the relay 134. Initially the subject momentarily moves the moving contact 132c to the start fixed contact 132s of the ignition switch 132, and current flows from the power source 46 through the coil 136 energizing the relay 134. The normally open contacts 138a and 138b close so that as the moving contact 132c is spring-returned to the fixed contact 132n, a holding path for the relay 134 is established dependent on the stall unit 24. With the relay thus energized its normally open contacts 142a and 142b close and its normally open contacts 144a and b close connecting the selected closed contacts (130c and 130–1 or 130–2 or 130–3) of the gear shift unit 20 to the motor control unit 12 to permit energization of the speed indicator unit 10 when the accelerator 112 is depressed. Whenever the clutch pedal 120 is improperly engaged, a normally closed switch 174 in the stall unit 24 opens and the relay holding circuit is broken. The relay 134 drops out and contacts 140a and 140b close. A voltage from the power source 46 is fed via the line 106 to the motor control unit 12 to drive the indicator 56 to the zero position thus simulating a stall. At the same time, the voltage is fed via the line 60 from the contact 140b through the switching unit 100 to the recorders 601, etc., for recording the stall.

The Stall Unit 24

The stall unit 24 is primarily a switching means for interrupting the relay holding circuit in the ignition unit 22 when the clutch pedal 120 is improperly engaged. The coupling member 126 has a slotted end which accommodates a stud 154 of the clutch pedal 120. A compression spring 156 constrained between a fixed washer 158 and collar 160 urges the coupling member 126 against the clutch pedal 120. The other end of the coupling member 126 has a freely rotatable wheel 162. The movement of the coupling member 126 causes a pivotal movement of a pivot arm 164 about its pinned end 166. The other end of the pivot arm 164 has a freely rotatable wheel 168. A compression spring 170 urges the pivot arm 164 against the spring loaded actuator 172 of a single-pole, single-throw switch 174 which is normally closed. Switch 174 is preferably of the microswitch type.

In the normal or rest position, the force exerted by the compression spring 170 and the spring loaded actuator 172 causes the pivot arm 164 to assume an equilibrium position with the switch 174 closed. However, when the clutch pedal 120 is depressed, the travel of the coupling member 126 causes the wheels 162 and 168 to roll over each other to pivot the pivot member 164 against the compression spring 170. Upon release of the clutch pedal 120, the compression spring 156 urges the coupling member 126 away from the pivot member 164. If the clutch pedal 126 is slowly released, the wheels 162 and 168 remain in contact during the return travel of the pivot arm 164 to its rest position. However, if the clutch pedal 126 is rapidly released, the wheels 162 and 168 strike each other and the contact between the wheels 162 and 168 is broken. The pivotal member 164 is then under the influence of the over-compressed compression spring 170 without any restraint from the wheel 162, so that the pivot arm 164 is driven past the rest position causing the triggering of the spring-loaded actuator 172 to open the switch 174. Thus the holding circuit for the relay 134 in the ignition unit 22 opens and the simulation of a stall is accomplished. It should be noted that means may be provided for adjusting the compression spring 170 to provide the proper rest position and overtravel forces for the pivot arm 164. Spring-adjusting means of this type are well known in the art.

Therefore, a relatively simple and inexpensive means for simulating and testing the operation of a clutch pedal by a subject is provided. The apparatus is also rugged and requires a minimum of maintenance after initial adjustment.

*Switching Unit 100 and Recorders 601, 611, 621 and 631*

Suitable switching means 100 and recorders 601, etc., are described in detail in the previously cited copending application Serial No. 683,814, filed September 13, 1957. These units may be employed by connecting the lines 60, 60a—63a, 60b—63b, 60c—63c, 60d—63d, of the present application to the corresponding lines 60, 60a—63a, 60b—63b, 60c—63c, 60d—63d, in the copending application.

CONCLUSION

Thus, in accordance with the invention, improved driver-training apparatus has been provided which very accurately simulates the speed indicator and clutch operation and which records proper brake operation under certain conditions, and yet which is sturdy and relatively simple and less expensive than prior apparatus.

It should be noted that while the invention has been described mainly in connection with automobile driver training, many of the features of the invention are equally applicable to training in the operation of other vehicles such as aircraft, ships and trains.

Although the invention has been disclosed in connection with a preferred embodiment, it will be apparent that many modifications and changes may readily be made without departing from the spirit and scope of the invention.

What is claimed is:

1. Apparatus for training a subject to move a plurality of automotive controls comprising a first control, switching means interconnected with said first control and responsive to the movement of said first control; motor means in circuit connection with and activated by said switching means; said switching means also including means interconnected with and responsive to said motor means to deactivate said motor means when said motor means is in a position corresponding to the position of said first control; a second control, control means interconnected with and responsive to said second control and interconnected with said motor means for controlling the rate of operation of said motor means; and an indicator interconnected with and responsive to the position of said motor means to indicate the amount of movement of said first control, said indicator moving at a rate determined by the rate of operation of said motor means.

2. Apparatus according to claim 1 in which said first control is an accelerator, said indicator is a simulated speedometer and said motor means is stationary for any particular value of simulated speed.

3. Apparatus according to claim 1 in which said second control comprises a simulated gear shift mechanism and said control means produce voltages dependent upon the setting of said gear shift.

4. Apparatus according to claim 1 in which said second control is a simulated brake and includes means for converting brake movement to voltage.

5. Apparatus according to claim 1 in which said first control comprises a simulated accelerator, said second control comprises a simulated gear shift, said indicator comprises a simulated speedometer and said motor means comprise a variable speed electrical motor.

6. In automotive driver trainer equipment, apparatus for testing a subject's movement of a control comprising motor means having an energizing circuit and being operable according to simulated vehicle speed, a speed indicator, means for positioning said indicator in accordance with the position of said motor means, rate means responsive to an abnormal rate of movement of said control, means interconnecting said rate means and said energizing circuit of said motor means for driving said motor means towards the zero speed condition when said abnormal rate occurs.

7. Apparatus according to claim 6 in which said control comprises a simulated clutch mechanically coupled to said rate means.

8. In an automobile simulator, means for simulating the speed of said automobile comprising simulated accelerator and brake controls, signal deriving means interconnected with said simulated brake, a position motor having motor speed control means the output position of said motor representing the speed of said automobile, and a circuit for rendering said motor responsive to said controls to thereby simulate the actual speed of an automobile as it is affected by real controls comprising connecting means from said accelerator to position control means of said position motor, and other connecting means from said brake signal deriving means to said speed control means of said position motor.

9. In an automobile simulator, means for simulating the speed of said automobile comprising simulated accelerator, brake, clutch, gear shift, and ignition controls, signal deriving means associated respectively with said brake, clutch, gear shift and ignition controls, a position motor having motor speed control means and position control means the output position of said motor simulating the speed of said automobile, and a circuit interconnected with and rendering said motor responsive to said controls to thereby simulate the actual speed of an automobile as it is affected by real controls and comprising connecting means from said accelerator to said position control means of said motor, and other connecting means from said signal deriving means to said speed control means of said position motor.

10. Apparatus according to claim 9 including stall simulating means and in which said signal deriving means of said ignition is also responsive to said stall-simulating means which are responsive in turn to said simulated clutch.

11. Apparatus according to claim 8 in which said signal deriving means comprise switching means.

12. Apparatus according to claim 8 including a simulated speedometer responsive to said position motor.

13. Apparatus according to calim 9 in which said stall-simulating means includes a plurality of rotatable inertial elements normally in mutual contact and responsive to the rate of release of said simulated clutch pedal.

14. Apparatus according to claim 8 including signal deriving means responsive to said accelerator and recording means responsive to the signal deriving means of said accelerator and brake.

15. Apparatus for recording the periodic depressing and releasing of a brake pedal comprising a source of power; a switch-operable by the brake pedal, said switch having a movable contact coupled to said source of power and first and second contacts, said movable contact being connected to said first contact when said brake pedal is depressed, said movable contact being connected to said second contact when said brake pedal is released; a time-delay relay, said time-delay relay having an energizing means and a pair of normally open contacts, said energizing means being connected to the first contact of said switch, the second contact of said switch being connected to one contact of said normally open pair of contacts; and a recording means for recording indicia when energized, said recording means being connected to the other contact of said normally open pair of contacts, said recording means being energized when the brake pedal is released after said time-delay relay is energized.

16. In driver training, apparatus for simulating for a subject the feel of clutch engagement comprising a clutch pedal; a source of power; a switch interconnected with and responsive to said clutch pedal, said switch having a first and a second contact, said first contact being connected to said source of power; and a vibrator energized by said source of power via said second contact when said contacts close, said vibrator being mechanically coupled to said clutch pedal to vibrate said clutch pedal.

References Cited in the file of this patent

UNITED STATES PATENTS

| | | |
|---|---|---|
| 2,269,444 | Durham et al. | Jan. 13, 1942 |
| 2,273,091 | De Silva | Feb. 17, 1942 |
| 2,341,312 | Chedister | Feb. 8, 1944 |
| 2,486,488 | Lukacs | Nov. 1, 1949 |
| 2,562,637 | Park et al. | July 31, 1951 |
| 2,700,227 | Arkell et al. | Jan. 25, 1955 |
| 2,715,783 | Chedister | Aug. 23, 1955 |
| 2,726,359 | Ray | Dec. 6, 1955 |
| 2,742,714 | Allgaier | Apr. 24, 1956 |
| 2,814,131 | Sheppard | Nov. 26, 1957 |
| 2,815,478 | Kuller | Dec. 3, 1957 |